United States Patent
Penumatcha et al.

(10) Patent No.: US 7,441,962 B2
(45) Date of Patent: Oct. 28, 2008

(54) MULTI-CHANNEL FIBER OPTIC CONNECTOR HAVING CAPTIVE ALIGNMENT SLEEVE AND SINGLE SEALING MEANS

(75) Inventors: Venkata R. Penumatcha, Plano, TX (US); Vincent A. Wouters, McKinney, TX (US)

(73) Assignee: Applied Optical Systems, Inc., Plano, TX (US)

( * ) Notice: Subject to any disclaimer, the term of this patent is extended or adjusted under 35 U.S.C. 154(b) by 0 days.

(21) Appl. No.: 11/473,385

(22) Filed: Jun. 22, 2006

(65) Prior Publication Data

US 2007/0297723 A1    Dec. 27, 2007

(51) Int. Cl.
*G02B 6/38* (2006.01)
(52) U.S. Cl. ............................. 385/71; 385/59; 385/76; 385/77; 385/78
(58) Field of Classification Search ................. None
See application file for complete search history.

(56) References Cited

U.S. PATENT DOCUMENTS 6,371,660 B1 * 4/2002 Roehrs et al. .................. 385/59

OTHER PUBLICATIONS

International Search Report issued by the United States Patent and Trademark Office on Feb. 29, 2008 in related International Patent Application No. PCT/US07/14601.
Written Opinion of the International Searching Authority issued by the United States Patent and Trademark Office on Feb. 29, 2008, in related International Patent Application No. PCT/07/14601.

* cited by examiner

*Primary Examiner*—Tina M Wong
(74) *Attorney, Agent, or Firm*—Robert D. McCutcheon (57) ABSTRACT

A multi-channel fiber optic cable connector is provided for connecting the terminal ends of fiber optic cables utilizing alignment sleeves to align the adjacent termini of optical fibers included within respective ones of the cables. A retention mechanism, a sleeve retainer, secured within the connector, is provided that secures the alignment sleeve within the connector. In another aspect, a single floating seal assembly extends around a termini and seals between the termini and a connector housing. The single seal assembly provides a dual sealing function, sealing between an aperture of a floating collar and the termini body and sealing between the floating collar and a seal surface of a bore in the connector housing.

25 Claims, 7 Drawing Sheets

MULTI-CHANNEL FIBER OPTIC CONNECTOR HAVING CAPTIVE ALIGNMENT SLEEVE AND SINGLE SEALING MEANS

TECHNICAL FIELD

The present invention relates generally to optical fiber light transmission systems, and more particularly to fiber optic connectors for use in coupling fiber optic conductors.

BACKGROUND

Prior art fiber optic connectors have been provided for joining cables which contain optical fibers. Additional background information regarding fiber optic connectors and descriptions of a prior art connector may be found in U.S. Pat. No. 6,305,849, which is incorporated herein by reference.

One problem with prior art connectors is the number and complexity of components that are manufactured and included within the connector to provide the desired functionality. One prior art connector utilizes two separate seal elements to seal a termini within a bore (sealed termini). This includes one floating seal assembly having a first O-ring seal and a second adjacent seal assembly having a separate O-ring seal. The use of two seals increases the cost and complexity of the termini/connector. Therefore, there exists a need for an improved seal element that reduces the number of components and provides the same or similar functionality as the prior art sealing elements.

In another aspect, it has been determined that a problem exhibited by prior art connectors is the use of an unsecured alignment sleeve within the connector to align the adjacent termini of optical fibers within coupled connectors. Because the sleeves have internal bores that are slightly larger than the outside diameter of the periphery of the termini ferrule, the alignment sleeves are relatively loose fitting around the ferrule. When a termini is removed from the connector (or when connectors are decoupled from one another), such as for cleaning or modification of the connector, the sleeve may fall out and become lost. This may be especially troublesome depending on the environment in which the connector is being used (i.e., in the field). Further, when the connectors are coupled, additional time may be required to ensure the sleeves are properly positioned before mating.

Accordingly, there exists a need for new connector and/or mechanism that secures or captivates the alignment sleeve in the connector, thereby reducing or eliminating the possibility of losing or damaging the alignment sleeves.

SUMMARY

In accordance with one embodiment, there is provided a multi-channel fiber optic cable connector for connecting the terminal ends of two multi-channel fiber optic cables having termini. The connector includes a first housing having a first connector face, a first insert cap tower with and two first tangs which extend forward of the first connector face. The two first tangs and the first insert cap tower are spaced apart to extend forward of the first connector face in a keyed arrangement for reciprocally engaging a second housing. The second housing having a second insert cap tower with two second tangs, the two first tangs fitting adjacent to the second insert cap tower, the first insert cap tower fitting adjacent to the second insert cap tower and the second tangs. The first insert cap tower includes a first interior passage which defines a first insert cap tower cavity within which is disposed a first termini. The first connector face includes a second interior passage which defines a first connector face cavity which is disposed between the first insert cap tower and the two first tangs, from which a second termini extends. An alignment sleeve is included having an interior bore operable for receiving an end portion of the first termini and an end portion of a third termini in a corresponding second connector. The connector further includes means for retaining the alignment sleeve within the interior bore.

In another embodiment, there is provided a fiber optic cable connector for coupling to a mating fiber optic connector to align terminal ends of optical fibers of two fiber optic cables for transmitting light signals therebetween. The connector includes a termini mounted to and including a terminal end portion of an optical fiber of a fiber optic cable, the termini having a longitudinal axis and end portions which extend around the terminal end of the optical fiber. A housing includes an interior passage disposed therein for receiving the termini, the housing having a shoulder disposed to extend into the interior passage, and substantially transverse to a longitudinal axis of the interior passage for retaining the termini within the passage. The connector further includes an alignment sleeve having an interior bore for receiving a first end portion of the termini which fits within the interior bore of the alignment sleeve, the alignment sleeve operable for aligning the termini of the housing with a corresponding termini of a housing of a second connector to align terminal ends of the optical fibers for transmitting light signals therebetween. A means disposed within the interior passage is provided for retaining the alignment sleeve therein.

In another embodiment, there is provided a method of making a fiber optic connector. A first connector housing is provided that having an interior passage, the interior passage configured for receiving a termini connectable to an optical fiber of a fiber optic cable, the interior passage having an shoulder. An alignment sleeve is inserted within the interior passage, the alignment sleeve capable of aligning terminal ends of two termini for transmitting light signals therebetween. Within the interior passage, a means is inserted and secured within the interior passage for retaining the alignment sleeve within the interior passage, such that when a termini present within the interior passage is removed, the alignment sleeve maintains its position within the interior passage and the means for retaining restricts longitudinal movement of the alignment sleeve.

In still another embodiment, there is provided a fiber optic cable connector for connecting the terminal ends of two fiber optic cables having termini of an optical fiber included within each cable. The connector includes a housing having an insert body with an interior passage disposed therein for receiving a termini of the optical fiber of one of the cables. The connector has at least one mating plane for aligning with a second at least one mating plane of a second housing for transmitting light signals therebetween. A shoulder is disposed to extend substantially transverse to a longitudinal axis of the interior passage for retaining the termini within the interior passage. A floating collar extends around the termini with a clearance fit between the floating collar and the termini such that the floating collar is free to move parallel to the longitudinal axis of the termini. The connector further includes a single seal element disposed within a seal gland, and sealingly engaging between the floating collar and a surface of the interior passage and sealingly engaging between the floating collar and the termini. The floating collar includes a first seal face extending parallel to the longitudinal axis of the termini and a second seal face extending substantially perpendicular to the longitudinal axis of the termini to define the seal gland. A biasing means energizes the single seal element.

In still another embodiment, there is provided a method of making a fiber optic connector operable for joining two fiber optic cables for transmitting light signals therebetween. A first connector housing is provided having an interior passage for receiving a first termini of the optical fiber of the fiber optic cable, the interior passage operably aligned for registering with an interior passage of a second connector housing. A floating collar is mounted around the first termini, the floating collar mounted to the first termini, slidable in a longitudinal direction relative to the first termini. A single seal element is disposed between the floating collar and the first termini and between the floating collar and the interior passage of the connector, sealingly engaging between the floating collar and a surface of the interior passage and sealingly engaging between the floating collar and the termini. The method further includes biasing the floating collar into a forward position wherein the forward end of the floating collar is pressed against the single seal element to energize the single seal element to sealingly engage between the floating collar and the termini. The termini is mounted within the interior passage of the first connector housing, with the single seal element sealingly engaging between the floating collar and the interior passage of the first connector housing.

Other technical features may be readily apparent to one skilled in the art from the following figures, descriptions, and claims.

BRIEF DESCRIPTION OF THE DRAWINGS

For a more complete understanding of the present invention, and the advantages thereof, reference is now made to the following descriptions taken in conjunction with the accompanying drawings, wherein like numbers designate like objects, and in which.

DETAILED DESCRIPTION

Figure 1:
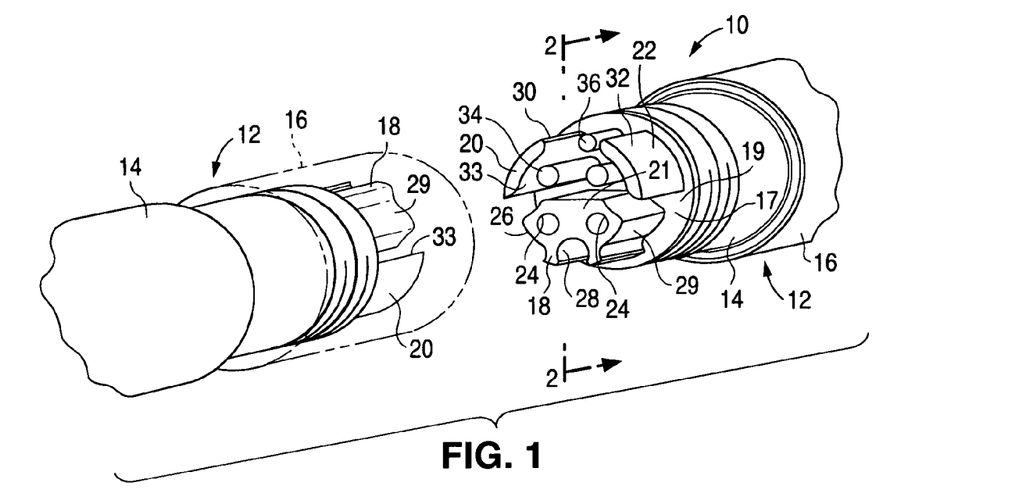
FIGS. 1 and 2 are a perspective view and a cross-sectional view taken along section line 2-2 of FIG. 1, respectively, of a hermaphroditic fiber optic cable coupling as set forth and described in prior U.S. Pat. No. 6,305,849 and further in accordance with one or more aspects of the present invention.

Certain aspects and embodiments of the system of the present invention are described in greater detail beginning with reference to FIG. 1, which depicts an illustrative embodiment of a fiber optic cable coupling in accordance with the present invention. The concepts, teachings and invention described herein may be used in different types of connectors, cables and cable assemblies, including those described more fully in U.S. Pat. Nos. 6,305,849, 6,357,929 and 6,371,660, which are incorporated herein by reference. Additional description of the subject matter of the present invention that may be necessary to an understanding of the present invention and the claims, and which is not described below or in the FIGURES, may be obtained from the above-identified U.S. patents which are incorporated herein by reference.

Referring to FIG. 1, there is shown a perspective view of a fiber optic coupling 10 which includes two fiber optic connectors 12. FIG. 1 is shown as being identical or similar to FIG. 1 of U.S. Pat. No. 6,305,849, and for ease of reference, the description set forth therein for FIG. 1 is substantially duplicated below.

Each of the fiber optic connectors 12 includes a connector housing 14, to which is secured (threadingly or otherwise) a coupling sleeve 16. The fiber optic connectors 12 are hermaphroditic in that the mating connectors 12 are exact duplicates of one another, and the two identical connectors 12 mate with one another. The coupling sleeves 16 of each of the connectors 12 are secured (threadingly or otherwise) to the connector housings 14 of respective ones of the connectors 12. The coupling sleeves 16 are selectively adjusted to make one of the mating connectors 12 correspond to a male connector and the other of the connectors 12 correspond to a female connector to dispose one in a male mode and the other in a female mode, respectively. The ends of the connector housings 14 of respective ones of the connectors 12 each include an insert cap 17, having three protuberant portions from which extend a recessed face 19 of the insert cap 17 to define a tower frame 18 and two tangs 20 and 22. The tower frame 18 defines an outwardly offset face 21, which is stepped outward of the recessed face of the insert cap 17. The three protuberant portions 18, 20 and 22 are arranged in an interlocking alignment with respective portions of a mating connector 12, such that the two tangs 20 and 22 are disposed in a keyed arrangement relative to the tower frame 18 for fitting on opposite sides of the tower frame 18 of the insert cap 17 of the mating connector 12.

The tower frame 18 contains two apertures 24 for passing optical fibers, and a periphery 26 which defines a recess 28 and exteriorly disposed side profiles 29. The tang 20 has a periphery 30 and the tang 22 has a periphery 32, with each of the peripheries 30 and 32 defining interiorly facing profiles 33. The interiorly facing profiles 33 of the tangs 20 and 22 fit flush against mating contours of the exteriorly disposed side profiles 29 of the tower frame 18 of the insert cap 17. Two termini 34 of optical fibers are shown disposed in the region between the insert cap tower 18 and respective ones of the two tangs 20 and 22. A head of a screw 36 is shown extending within the same region. The recess 28 is fitted with a screw and is also is provided for receiving a second retaining screw 36 of a mating one of the connectors 12. Two termini 34 (not shown) are disposed within respective ones of the apertures 24.

Figure 2:
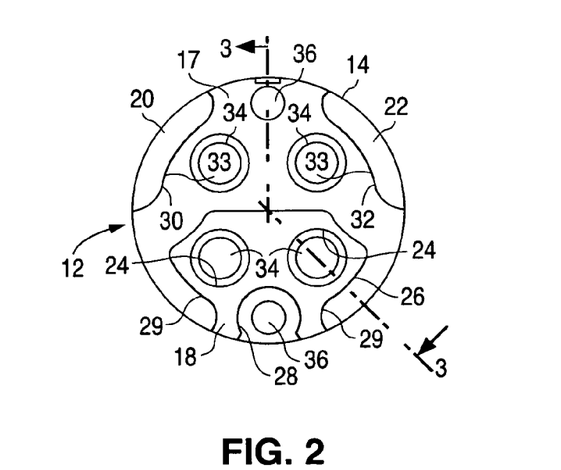

Referring to FIG. 2, there is shown a cross-sectional view of one of the connectors 12, taken along line 2-2 of FIG. 1. FIG. 2 is shown as being identical or similar to FIG. 2 of U.S.

Pat. No. 6,305,849, and for ease of reference, the description set forth therein for FIG. 2 is substantially duplicated below.

Four of the termini 34 are shown for a four channel connector 12 of one embodiment, however, the connector 12 may include fewer or more channels than four. The two retaining screws 36 are shown disposed at opposite sides of the face of the connector 12. The profile 29 of the periphery 26 of a first one of the connectors 12 has arcuately-shaped surfaces which are configured for matingly engaging with the profiles 33 of the peripheries 30 and 32 of respective ones of the tangs 20 and 22 of the other of the connector 12, for aligning the apertures 24 in the insert cap 17 of the first one of the connectors 12 with the termini 34 disposed adjacent to the tangs 20 and 22 of the second one of the connectors 12 for optically coupling the optical fibers of the two mating connectors 12. Preferably, the mating portions of the profile 29 of the frame 18 define an exteriorly facing, arcuately shaped sidewall surfaces 26 which mate substantially flush with interiorly facing, arcuately shaped sidewall portions of the profiles 33 of the tangs 20 and 22, with a sliding clearance therebetween to allow the connectors 12 to be engaged and disengaged.

It will be understood that aspect(s) of the present invention described may be utilized in connectors having different configurations than that shown in FIGS. 1 and 2, and those aspect(s) are not necessarily limited to use in such illustrated configuration(s).

Figure 2A:
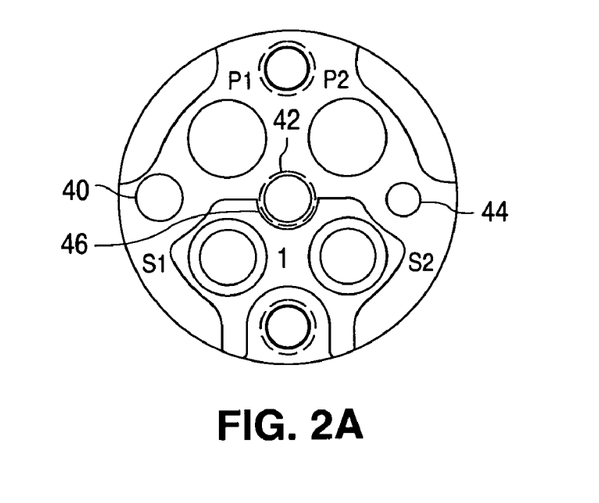
FIG. 2A is an alternative embodiment of the connector shown in FIG. 2.

Now referring to FIG. 2A, there is illustrated one alternative embodiment or configuration of the connector 12, as shown. The connector 12 includes additional apertures 40, 42, and 44. The aperture 40 and aperture 44 are each configured to receive a pin extending from the insert body (or within the connector) to ensure that the insert cap is oriented correctly. The apertures are preferably different sizes. The aperture 42 includes threads providing a mechanism (using a tool) for inserting/removing the insert cap from the insert body. In addition, the tower frame 18 of the insert cap 17 includes an arcuate-shaped sidewall portion 46 providing clearance for some sort of member or insert (not shown) to be included within or through the aperture 42.

Figure 3A:
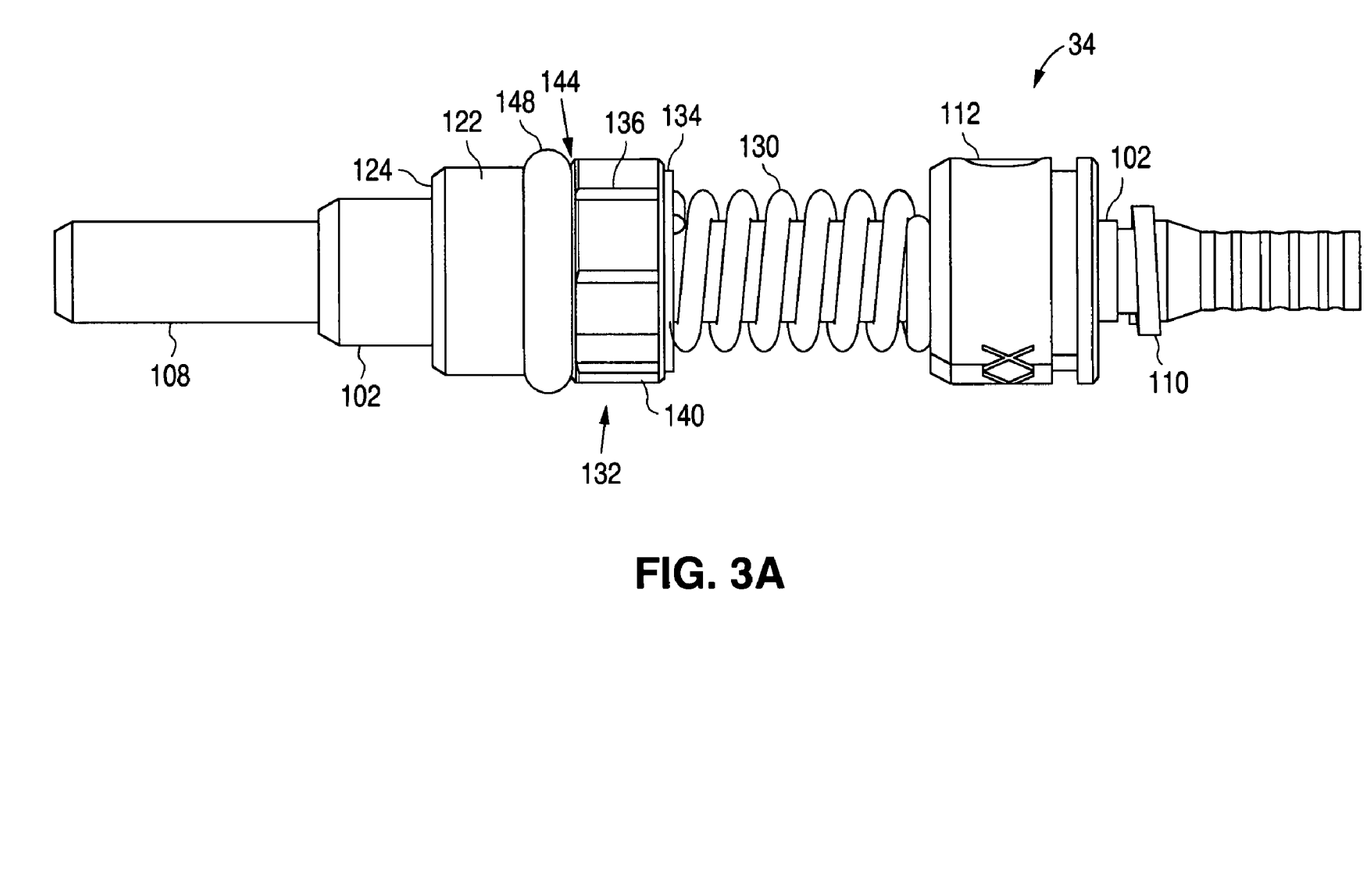
FIG. 3A is a side view of a terminus of one of the optical fibers of the connector in accordance aspects of the present invention.

Now referring to FIG. 3A, there is illustrated a side view of a terminus of one of the optical fibers of the connector in accordance with aspects of the present invention. Also referring to FIG. 3B, there is shown a longitudinal section view of a portion of the connector, illustrating the terminus, taken along line 3-3 of FIG. 2, in accordance with one or more aspects of the present invention.

Figure 3B:
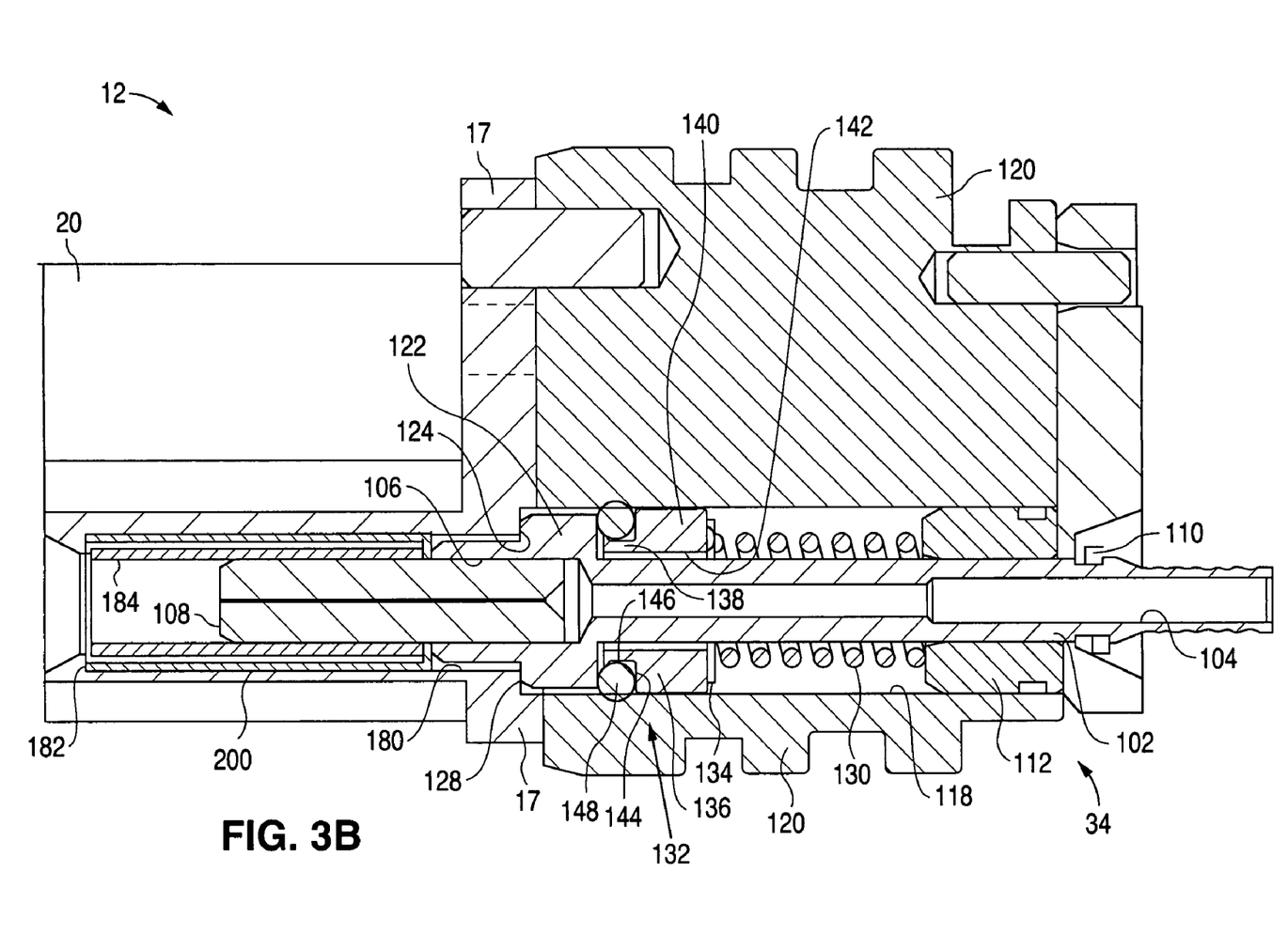
FIG. 3B is a longitudinal section view of a portion of the connector, illustrating the terminus, taken along line 3-3 of FIG. 2, in accordance with one or more aspects of the present invention.

Though not shown, the termini 34 is typically mounted on the terminal end of an optical fiber (not shown). The termini 34 and connector 12 are similar to the termini and connector illustrated in FIGS. 5 and 7 of U.S. Pat. No. 6,305,849. However, the termini 34 and connector of the present invention includes various improvements over the prior art termini. Not all elements of the termini 34 and connector 12 will be described below, and reference may be made to U.S. Pat. No. 6,305,849.

The termini 34 includes a pin body 102 having a longitudinal axis. The pin body 102 has a longitudinally extending bore 104 and a forwardly disposed counter bore 106, which are concentric with the longitudinal axis. The bore 104 is sized for receiving an optical fiber and the clad which extends around the core defined by the fiber. A ferrule 108 is rigidly secured in a forwardly disposed bore 106. An annular groove extends into an exterior surface of the pin body 102 for receiving a retaining ring 110.

A retaining collar 112 is secured around an exterior 114 of the pin body 102. The retaining collar 112 is secured in a bore 118 of an insert body 120 by a terminus retainer. The insert cap 17 and the insert body 120 form the connector housing for the connector 12 which houses the termini 34. As described in U.S. Pat. No. 6,305,849, the retaining collar 112 may have an inner profile defined by two tapered surfaces, which each taper toward the center of the retaining collar 112, such that each surface is wider at the outward ends, thus providing a protuberance extending interiorly within the retaining collar 112. The protuberance is disposed between the tapered surfaces such that the protuberance defines an annular-shaped gimbal ring surface. Alternatively, the inner profile of the retaining collar 112 has a uniform diameter and thus, non-tapered surfaces (except for possible chamfers on the edges).

An annular-shaped rib 122 extends from the exterior periphery on the forward end of the pin body 102. The forward end of the annular-shaped rib 122 defines a shoulder 124 which engages the rearward facing shoulder 128 of the insert cap 17 to retain the termini 34 within the bore 118.

The ferrule 108 has a cylindrically-shaped periphery and a forward contact surface. Preferably, the forward contact surface of the ferrule 108 is slightly rounded in a central region, and has rounded edges with a sharper curvature on the edge than in the central region. In other embodiments, the central region of the forward contact surface may be a fully planar surface. In some such embodiments, the surface of the central region may also be disposed at an angle. The ferrule 108 has a central bore for receiving the core of the optical fiber. A tapered entrance for receiving the fiber may be provided.

A coil spring 130 extends around the exterior of the pin body 102, between the forward end of the retaining collar 112 and a rearward end of a floating seal 132. The floating seal 132 includes an annular ring 134 and a floating collar 136 which slidably extends around and over the pin body 102. The annular ring 134 is preferably a flat washer. In some embodiments, the annular ring 134 may be omitted, but is provided herein to prevent the spring 130 from jamming between the pin body 102 and the floating collar 136. The floating collar 136 is annular-shaped, and preferably has first portion 138 and a second portion 140 and an interior bore 142 which may move longitudinally along the pin body 102, parallel to the longitudinal axis. The movement of the floating collar 136 in a direction transverse to the longitudinal axis is limited by both a clearance fit between the interior bore 142 and the periphery of the pin body 102, and the clearance between the outside diameter of the floating collar 136 and the bore 118 of the insert body 120.

The first portion 138 includes a forwardly facing seal surface 144 and the second portion includes an exterior-facing seal surface 146. A single seal element or gland 148 sealingly engages between the seal surface 146 and the interior bore 118 of the insert body 120. The O-ring seal element 148 also sealingly engages between the seal surface 144 and a rearwardly facing surface of the annular-shaped rib 122. Thus, the seal element 148 provides dual sealing functions, without requiring two separate seal elements. The floating collar 136 is preferably sized to have a predetermined clearance fit with the bore 118 of the insert body 120, such that it is free to move for only a limited distance in radial directions with respect to, or transversely to, the longitudinal axis of the bore 118. This limited distance determines the range of the squeeze applied to the sealing element 148 for sealing between the bore 118 and the seal surface 146. The range of squeeze applied to the sealing element 148 determines the energization for the sealing element 148. The resilience of the sealing element 148 which is squeezed between the floating collar 136 and the bore 118, tends to center the floating collar 136 within the bore 118. In one embodiment, the sealing element 148 is an O-ring.

The spring 130 presses between the retaining collar 112 and the annular ring 134, and is shown in a compressed state. The spring 130 presses the floating collar 136 against the seal element 148 to squeeze the seal element 148 between the seal surface 144 and the rearwardly facing surface of the annular rib 122, thereby providing a biasing means for energizing the seal element 148. The forward end of the pin body 102 is free to move radially with respect to, that is, transversely to the longitudinal axis of the bore 118 in the directions for distances determined by the clearance between the bore 142 of the floating collar 136 and the pin body 102.

The insert cap 17 includes multiple bores 180 (one shown) for receiving various ones of the termini 34. A shoulder 182 is provided in the forward end of the bore 180 for retaining an alignment sleeve 184 within the bore 180 of the insert cap 17.

Figure 3C:
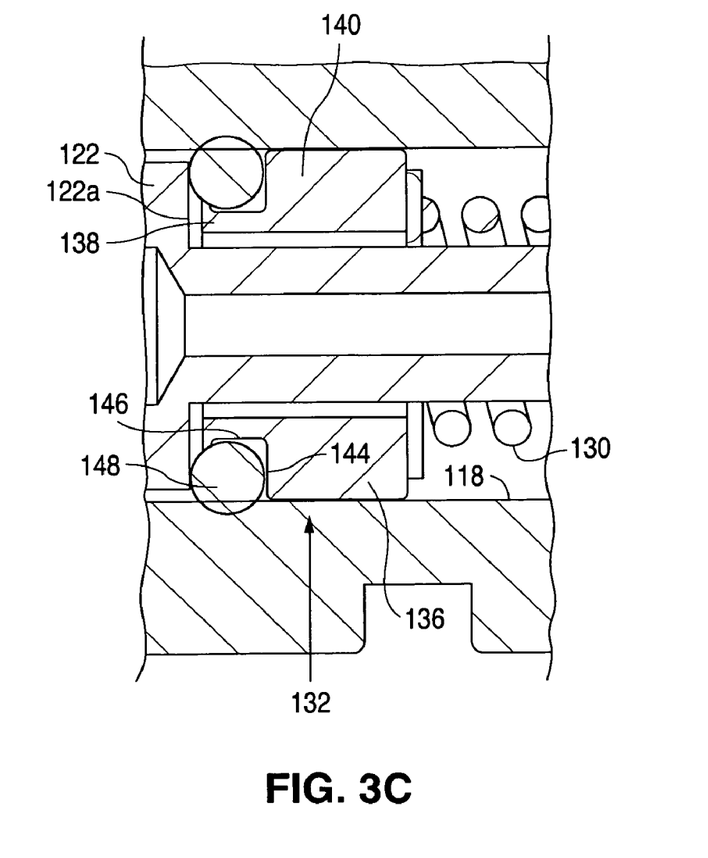
FIG. 3C is a detailed cross sectional view of the floating seal of FIG. 3B.

Now referring to FIG. 3C, there is shown an exploded view of the floating seal 132. The seal element 148 provides a sealing function between the bore 118 and the floating collar 140—between seal surface 146 and the surface of the bore 118. The seal element 148 also provides a sealing function between the annular rib 122 of the pin body 102 and the floating collar 136—between the seal surface 144 and the rearwardly facing surface 122a of the annular rib 122. When inserted in the insert cap 17 and the insert body 120, the termini 34 is sealed. The floating seal 132 provides a barrier and environmental seal useful in certain applications.

Figure 4A:
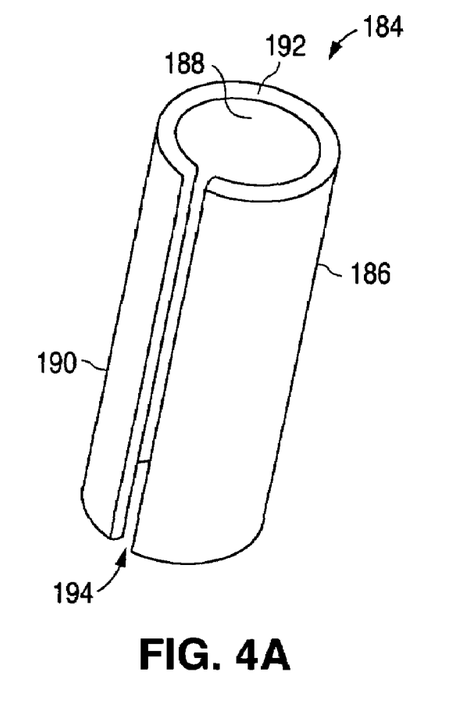
FIGS. 4A, 4B and 4C are perspective view, end view and longitudinal section view along line A-A of FIG. 4B, respectively, of an alignment sleeve.
Figure 4B:
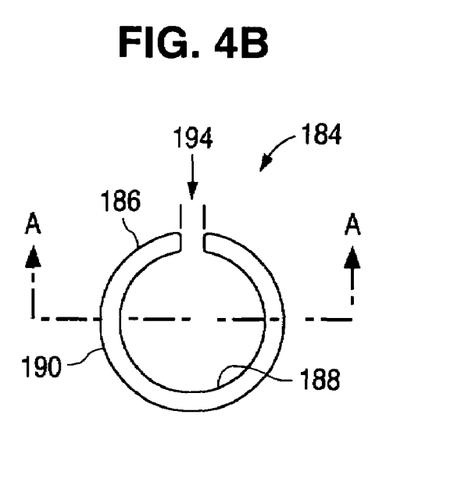
Figure 4C:
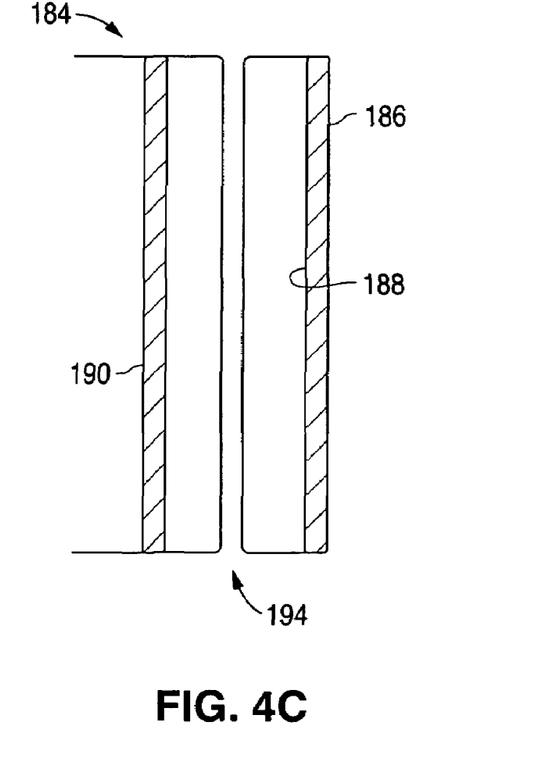

FIGS. 4A, 4B and 4C are a perspective view, an end view, and a longitudinal section view taken along section line A-A of FIG. 4B, respectively, of the alignment sleeve 184. The alignment sleeve 184 has a tubular body 186 which is preferably made of a rigid ceramic material, such as zirconia. In the preferred embodiment, the tubular body 186 is cylindrical and has a central axis. The alignment sleeve 184 includes a bore having an interior profile 188 for mating with the peripheries of two of the ferrules 108, over the lengths of the ferrules 108 and the sleeve 184, for aligning the two ferrules 108 together for transmitting light between optical fibers disposed in the bores of the two ferrules 108. An exterior periphery 190 is provided for mating with the profile of the bore 180 of the insert cap 17, or with a sleeve retainer, as described more fully below. Preferably, the interior profile 188 of the alignment sleeve 184 and the periphery of the ferrule 108 are cylindrical, however, in other embodiments may include other mating shapes for aligning the ferrules 108 of abutting ones of the termini 34 for transmitting light therebetween. Similarly, the exterior periphery 190 of the alignment sleeve 184 and the profile of the bore 180 which extend through the insert cap 17 are also preferably cylindrical, but may also be provided with other mating shapes for aligning and retaining the alignment sleeves 184 relative to the bores 180 of the insert cap 17. The ends 192 may be beveled to guide the contact surfaces of the terminal ends of the termini 34 into the bore 180.

The alignment sleeve 184 includes a longitudinal split (identified by reference numeral 194) extending along the length of the body 186. In another embodiment, the body 186 of the alignment sleeve 184 is solid with no split(s) and has a continuous and solid body. Thus, the sleeve 184 may be a solid sleeve or a split sleeve. A split sleeve may be required, or more desirable, in some applications.

The sleeve 184 is designed to receive, align and protect the corresponding mating ends of the ferrules of the termini 34. The connectors 12 and termini 34 are designed such that the insert cap 17 is removed the termini 34 are exposed for cleaning cleaning, repair, etc. When insert cap 17 is removed, the sleeves 184 typically adhere to the ferrule 108 of the removed termini 34 (due to design and tolerances). During removal and subsequent operations prior to reinsertion, the sleeves 184 may be intentionally removed or inadvertently fall off the ferrules 108 and may become lost. Thus, prior art connectors have alignment sleeves that may more easily become lost or damaged during termini maintenance.

Referring back to FIG. 3B, the insert cap 17 further includes a sleeve retainment or retention mechanism 200 to retain the sleeve 184 within the bore 180 of the insert cap 17. The sleeve retainer (or insert) 200 holds or retains the alignment sleeve 184 within the bore 180, while allowing the alignment sleeve 184 to function as intended. Typically, the alignment sleeve 184 is placed within the bore 180 and the sleeve retainer 200 is then inserted therearound. One end of the sleeve retainer 200 abuts the shoulder 182 and the other end includes an annular lip for retaining the alignment sleeve 184, as shown in FIG. 3B. In the embodiment shown, the sleeve retainer 200 maintains and positions the alignment sleeve 184 within the bore 180 and substantially surrounds the alignment sleeve 184.

The sleeve retainer 200 when secured within the bore 180 also secures the alignment sleeve 184 within the insert cap 17 and when the insert cap 17 is removed from the connector 12. In one embodiment, the sleeve retainer 200 is secured in the bore 180 using a press fit (e.g., sized slightly larger than the bore 180, with or without a split sleeve configuration). In another embodiment, the sleeve retainer 200 is secured therein by deforming a portion of the insert body 17 adjacent to the inserted sleeve retainer 200. This may be accomplished by application of a punch or similar instrument along the outer surface of the insert cap 17 or within the bore 180 such that the insert cap material is extruded slightly behind the retainer 200.

Figures 5A, 5B, 5C, 6:
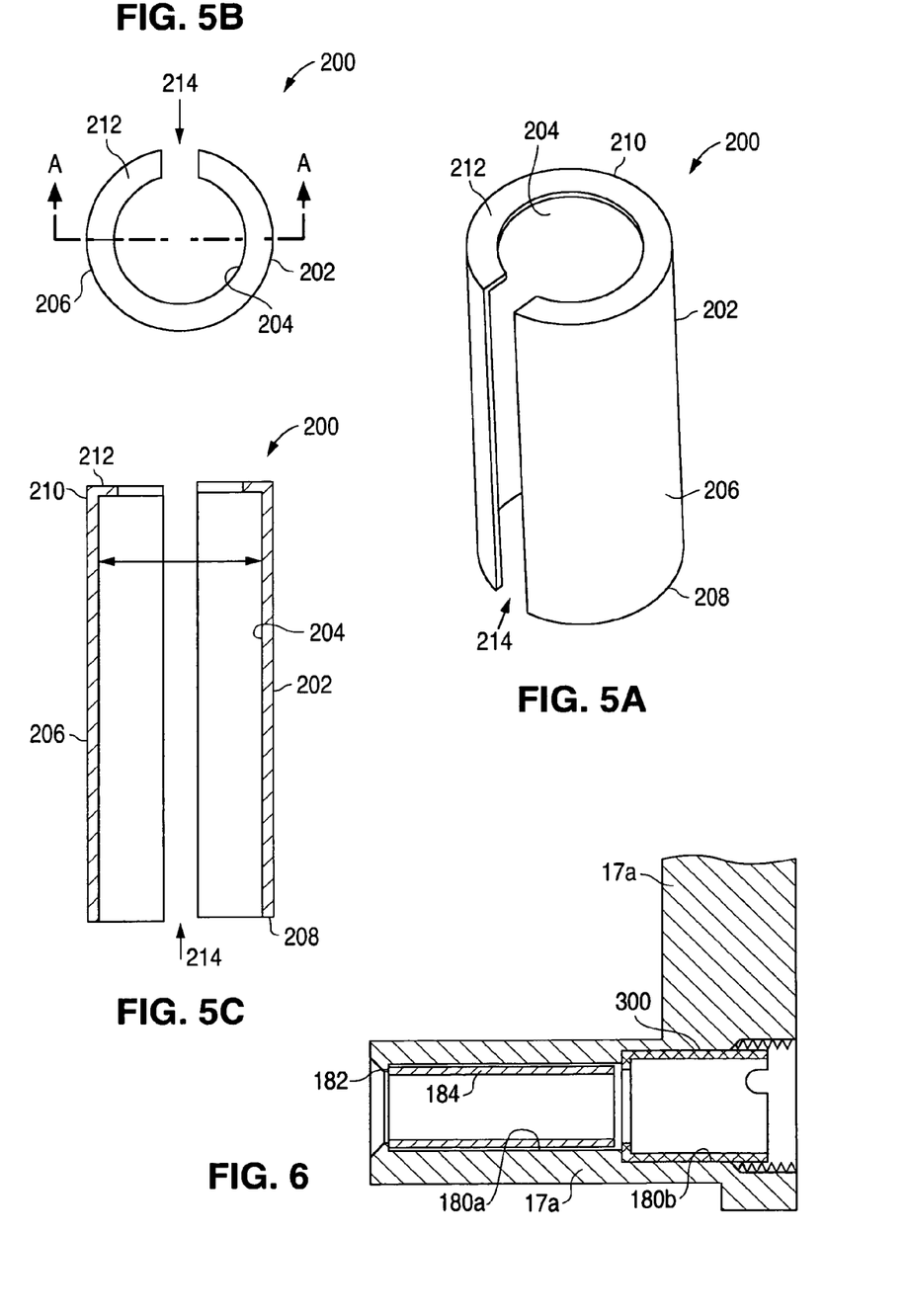
FIGS. 5A, 5B and 5C are perspective view, end view and longitudinal section view along line A-A of FIG. 5B, respectively, of an oversleeve or alignment sleeve retainer in accordance with one aspect of the present invention.
FIG. 6 is a cross-section view illustrating selected portions of another embodiment of the insert body (without termini) and sleeve retainer mechanism.

FIGS. 5A, 5B and 5C are a perspective view, an end view, and a longitudinal section view taken along section line A-A of FIG. 5B, respectively, of the sleeve retainer 200. The sleeve retainer 200 has a tubular body 202 which is preferably made of a rigid material, such as stainless steel. In the preferred embodiment, the tubular body 202 is cylindrical and has a central axis. The retainer 200 includes a bore having an interior profile 204 for containing the alignment sleeve 184. An exterior periphery 206 is provided for mating with the profile of the bore 180 of the insert cap 17. Preferably, the interior profile 204 of the sleeve retainer 200 and the periphery of the alignment sleeve 184 are cylindrical, however, in other embodiments may include other mating shapes for retaining the alignment sleeve 184 within the bore 180. Similarly, the exterior periphery 206 of the sleeve retainer 200 and the profile of the bore 180 which extend through the insert cap 17 are also preferably cylindrical, but may also be provided with other mating shapes. The retainer 200 includes a first end 208 and a second end 210. The first end 208 is configured to abut the shoulder 182 (of the insert cap 17). The second end 210 includes an annular lip or ring 212 for retaining the alignment sleeve 184 within the bore of the sleeve retainer 200 (and consequently within the bore 180). As shown, the shoulder 182 and the annular lip or ring 212 function to hold the alignment sleeve 184 within the bore 180 of the insert cap 17 within the connector 12. In other words, the shoulder 182 and the second end 210 (e.g., the lip 212) of the retainer sleeve 200 restricts the longitudinal movement of the alignment sleeve 184.

The sleeve retainer 200 includes a longitudinal split (identified by reference numeral 214) extending along the length of the body 202. In another embodiment, the body 202 of the sleeve retainer 200 is solid with no split(s) and has a continuous and solid body. Thus, the sleeve retainer 200 may be a solid or a split sleeve retainer. A split sleeve retainer may be required, or more desirable, in some applications.

The sleeve retainer 200 functions to secure the alignment sleeve 184 in a position within the bore 180 when the termini 34 is present (and when removed). As a result, removing the insert cap 17 from the connector 12 (and consequently from the termini 34) will not result in the removal of the alignment sleeve 184 from the insert cap 17.

Now referring to FIG. 6, there is shown a cross-section view illustrating selected portions of an alternative arrangement of the insert cap (without termini 34) and sleeve retainer mechanism. The insert cap 17a is similar to the insert cap 17 of FIG. 3B, with modifications as shown. The insert cap 17a includes a bore 180a and a second bore 180b. A sleeve retainer 300 is secured within the second bore 180b. The securing may be by means known to those skilled in the art. In one embodiment, the surface of the second bore 180b includes threads to engage matching threads on the sleeve retainer 300. Thus, the alignment sleeve 184 may be inserted in the bore 180a and the sleeve retainer 300 is threaded within the bore 180b and secures the alignment sleeve 184 within the insert cap 17a. The sleeve retainer 300 provides a screw in captivator. With threads, the sleeve retainer 300 is removable, consequently, the alignment sleeve 184 is removable. Dependent on the type of alignment sleeve used, a spacing sleeve (not shown) may be useful to maintain the sleeve in a central location within the bore.

Figure 7A:
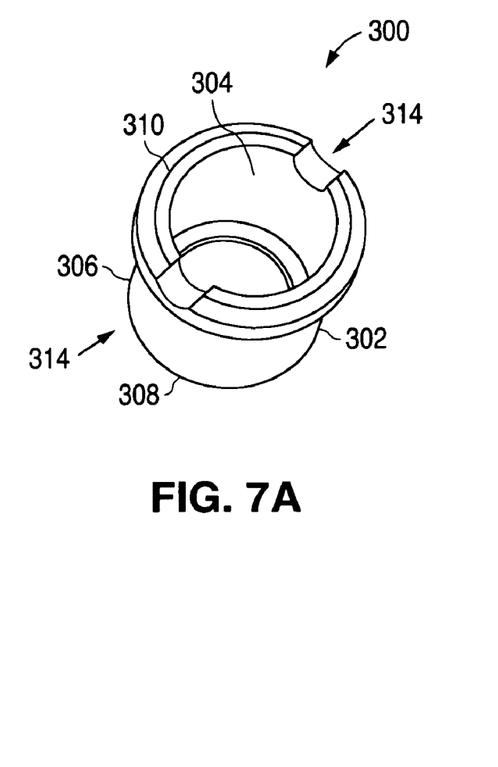
FIGS. 7A, 7B, 7C and 7D are a perspective view, a side view, an end view, and a longitudinal section view taken along section line A-A of FIG. 7C, respectively, of the alignment sleeve retainer of FIG. 6.
Figure 7B:
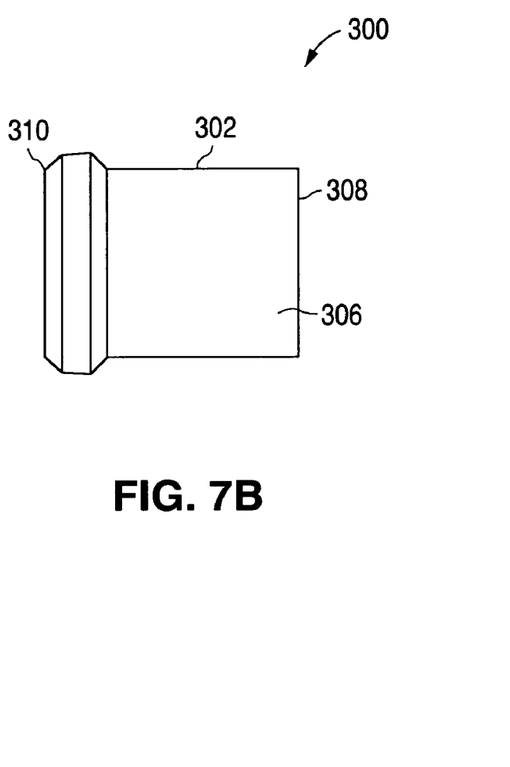
Figure 7C:
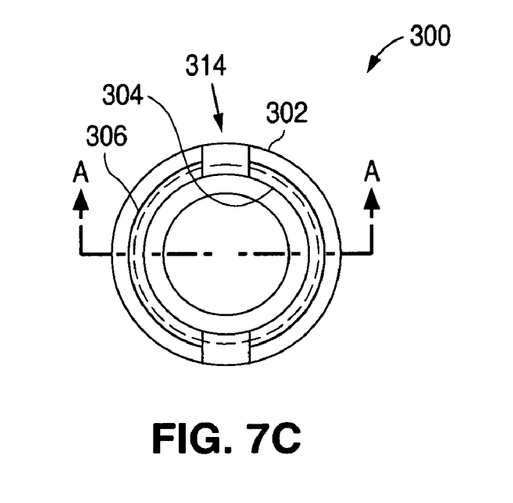

FIGS. 7A, 7B, 7C and 7D are a perspective view, a side view, an end view, and a longitudinal section view taken along section line A-A of FIG. 7C, respectively, of the sleeve retainer 300. The sleeve retainer 300 has a tubular body 302 which is preferably made of a rigid material, such as stainless steel. In the preferred embodiment, the tubular body 302 is cylindrical and has a central axis. The retainer 300 includes a bore having an interior profile 304 sized to allow insertion of the termini 34. An exterior periphery 306 is provided for mating with the profile of the bore 180b of the insert cap 17a. The exterior periphery 306 of the sleeve retainer 300 and the profile of the bore 180b which extend through the insert cap 17a are preferably cylindrical, but may also be provided with other mating shapes. The retainer 300 includes a first end 308 and a second end 310. The first end 308 is configured to abut an inner shoulder between the bores 180a, 180b. The first end 310 also includes an annular lip or ring 312 for retaining the alignment sleeve 184 within the bore 180 (of the insert cap 17a). As shown, the shoulder 182 and the annular lip or ring 312 function to hold the alignment sleeve 184 within the bore 180 of the insert cap 17a within the connector 12.

Figure 7D:
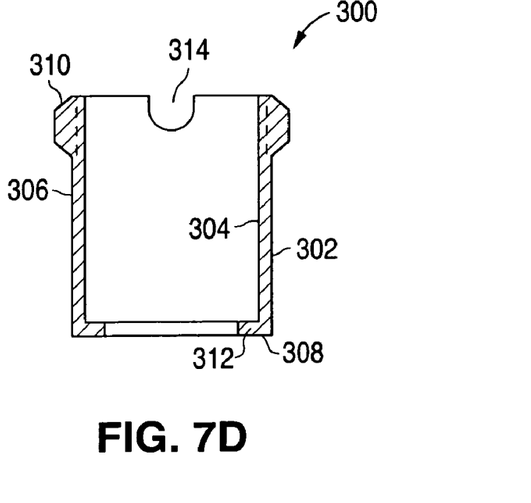

The second end 310 of the sleeve retainer 300 may include an annular section, lip or ring, as shown. The second end 310 may include notches 314. The notches 314 function to provide a mechanism for receiving the head of a screwdriver or other similar instrument. Threads (not shown) are included on the annular section of the second end 310 for engaging threads within the bore 180b. Alternatively, threads may be positioned along any portion of the body 302, with additional threads correspondingly positioned along the bore 180b. Alternative configurations and shapes for the retainer 300 may be utilized also.

In another embodiment, the retainer sleeve 300 may be a simple cylindrical sleeve having a uniform diameter with a predetermined sidewall thickness with threads formed along the entire length, or at least a portion of, the external surface of the sleeve 300. The threads engage corresponding threads within the bore 180. The second end may include notches similar to the notches 314, and the second end (thickness) 308 restricts the longitudinal movement of the alignment sleeve 184.

The sleeve retainer 300 functions to secure the alignment sleeve 184 in a position within the bore 180 when the termini 34 is present (and when removed). When removed, the sleeve retainer 300 (removable) may be removed, and similarly, the alignment sleeve 184 may be removed, for a desired purpose.

The terms "terminus", "termini" and "terminal" may be used interchangeably herein, and each refers to the end connection or terminal (and may be configured as either a pin/male or socket/female)) of an electrical or fiber optic cable or conductor, without limitation.

It may be advantageous to set forth definitions of certain words and phrases used throughout this patent document. The terms "include" and "comprise," as well as derivatives thereof, mean inclusion without limitation. The term "or" is inclusive, meaning and/or. The phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like.

While this disclosure has described certain embodiments and generally associated methods, alterations and permutations of these embodiments and methods will be apparent to those skilled in the art. Accordingly, the above description of example embodiments does not define or constrain this disclosure. Other changes, substitutions, and alterations are also possible without departing from the spirit and scope of this disclosure, as defined by the following claims.

What is claimed is:

1. A multi-channel fiber optic cable connector for connecting the terminal ends of two multi-channel fiber optic cables having termini, the connector comprising:

a first housing having a first connector face, a first insert cap tower and two first tangs which extend forward of the first connector face, wherein the two first tangs and the first insert cap tower are spaced apart to extend forward of the first connector face in a keyed arrangement for reciprocally engaging a second housing with a second insert cap tower with two second tangs, the two first tangs fitting adjacent to the second insert cap tower, the first insert cap tower fitting adjacent to the second insert cap tower and the second tangs;

the first insert cap tower having a first interior passage which defines a first insert cap tower cavity within which is disposed a first termini;

the first connector face having a second interior passage which defines a first connector face cavity which is disposed between the first insert cap tower and the two first tangs, from which a second termini extends;

an alignment sleeve having an interior bore operable for receiving an end portion of the first termini and an end portion of a third termini in a corresponding second connector; and means for retaining the alignment sleeve within a bore of the connector when the first termini is removed from the connector.

2. The multi-channel fiber optic cable connector in accordance with claim 1 wherein the means for retaining comprises a retaining insert positioned within the bore of the connector.

3. The multi-channel fiber optic cable connector in accordance with claim 1 wherein the means for retaining comprises a threaded insert within the bore and having a configuration for maintaining the position of the alignment sleeve between the insert and a shoulder within the connector.

4. The multi-channel fiber optic cable connector in accordance with claim 1 wherein the means for retaining comprises a retaining sleeve that substantially surrounds the alignment sleeve.

5. The multi-channel fiber optic cable connector in accordance with claim 4 wherein the retaining sleeve is formed of stainless steel.

6. The multi-channel fiber optic cable connector in accordance with claim 5 wherein the retaining sleeve has a first end and a second end, the second end having an annular lip for restricting longitudinal movement of the alignment sleeve within the interior bore.

7. The multi-channel fiber optic cable connector in accordance with claim 5 wherein the retaining sleeve is a split-sleeve.

8. A fiber optic cable connector for coupling to a mating fiber optic connector to align terminal ends of optical fibers of two fiber optic cables for transmitting light signals therebetween, the connector comprising:
   a termini mounted to and including a terminal end portion of an optical fiber of a fiber optic cable, the termini having a longitudinal axis and end portions which extend around the terminal end of the optical fiber;
   a housing having an interior passage disposed therein for receiving the termini, the housing having a shoulder disposed to extend into the interior passage, substantially transverse to a longitudinal axis of the interior passage for retaining the termini within the passage;
   an alignment sleeve having an interior bore for receiving a first end portion of the termini which fits within the interior bore of the alignment sleeve, the alignment sleeve operable for aligning the termini of the housing with a corresponding termini of a housing of a second connector to align terminal ends of the optical fibers for transmitting light signals therebetween; and
   means disposed within the interior passage for retaining the alignment sleeve therein.

9. The fiber optic cable connector in accordance with claim 8 wherein the means for retaining comprises a threaded insert within the interior bore and having a configuration for maintaining the position of the alignment sleeve between the insert and a shoulder within the connector.

10. The fiber optic cable connector in accordance with claim 8 wherein the means for retaining comprises a retaining sleeve that substantially surrounds the alignment sleeve.

11. The fiber optic cable connector in accordance with claim 10 wherein the retaining sleeve has a first end and a second end, the second end having an annular lip for restricting longitudinal movement of the alignment sleeve within the interior bore.

12. The fiber optic cable connector in accordance with claim 8 wherein the housing comprises:
   a forwardly extending first insert cap defining a first tower frame, a first connector face and two first tangs, the first tower frame and two first tangs extending forward of the first connector face, and wherein the two first tangs and the first insert cap are spaced apart in a keyed arrangement for receiving a second tower frame of a second insert cap of a mating fiber optic connector, the second insert cap having the second tower frame and two second tangs, wherein the two first tangs fit adjacent to the second tower frame and the two second tangs fit adjacent to the first tower frame, such that the first tower frame has a first tower frame end face which faces the second connector face and the second tower frame has a second tower frame end face which faces the first connector face.

13. The fiber optic cable connector in accordance with claim 12 wherein the first tower frame, the first tangs and the first connector face of the first insert cap are identically arranged to the second tower frame, the second tangs and the second connector face of the second insert cap to define a hermaphroditic fiber optic cable connector.

14. A fiber optic cable connector for connecting the terminal ends of two fiber optic cables having termini of an optical fiber included within each cable, the connector comprising:
   a housing having an insert body with an interior passage disposed therein for receiving a termini of the optical fiber of one of the cables;
   at least one mating plane for aligning with a second at least one mating plane of a second housing for transmitting light signals therebetween;
   a shoulder disposed to extend substantially transverse to a longitudinal axis of the interior passage for retaining the termini within the interior passage;
   a floating collar extending around the termini with a clearance fit between the floating collar and the termini such that the floating collar is free to move parallel to the longitudinal axis of the termini;
   a single seal element disposed within a seal gland, and sealingly engaging between the floating collar and a surface of the interior passage and sealingly engaging between the floating collar and the termini;
   the floating collar having a first seal face extending parallel to the longitudinal axis of the termini and a second seal face extending substantially perpendicular to the longitudinal axis of the termini to define the seal gland; and
   biasing means to energize the seal element.

15. The fiber optic cable connector in accordance with claim 14 further comprising:
   an alignment sleeve having an interior bore and disposed within the interior passage wherein the termini and a second termini fit within opposite ends of the alignment sleeve to align terminal ends of the first termini and second termini for transmitting light signals therebetween; and
   means disposed within the interior passage for retaining the alignment sleeve within the interior passage.

16. The fiber optic cable connector in accordance with claim 15 wherein the means for retaining comprises a threaded insert within the interior bore and having a configuration for maintaining the position of the alignment sleeve between the insert and a shoulder within the connector.

17. The fiber optic cable connector in accordance with claim 15 wherein the means for retaining comprises a retaining sleeve that substantially surrounds the alignment sleeve.

18. The fiber optic cable connector in accordance with claim 17 wherein the retaining sleeve is formed of stainless steel.

19. The fiber optic cable connector in accordance with claim 17 wherein the retaining sleeve has a first end and a second end, the second end having an annular lip for restricting longitudinal movement of the alignment sleeve within the interior passage.

20. The fiber optic cable connector in accordance with claim 19 wherein the retaining sleeve is a split-sleeve.

21. A method of making a fiber optic connector operable for joining two fiber optic cables for transmitting light signals therebetween, the method comprising:
   providing a first connector housing having an interior passage for receiving a first termini of the optical fiber of the fiber optic cable, the interior passage operably aligned for registering with an interior passage of a second connector housing;

mounting a floating collar around the first termini, the floating collar mounted to the first termini, slidable in a longitudinal direction relative to the first termini;

disposing a single seal element between the floating collar and the first termini and between the floating collar and the interior passage of the connector, sealingly engaging between the floating collar and a surface of the interior passage and sealingly engaging between the floating collar and the termini, biasing the floating collar into a forward position wherein the forward end of the floating collar is pressed against the single seal element to energize the single seal element to sealingly engage between the floating collar and the termini; and mounting the termini within the interior passage of the first connector housing, with the single seal element sealingly engaging between the floating collar and the interior passage of the first connector housing.

22. The method in accordance with claim 21 further comprising:

slidably disposing an alignment sleeve within the interior passage of the first connector housing, with the first termini disposed in the alignment sleeve; and securing within the interior passage means for retaining the alignment sleeve within the interior passage.

23. The method in accordance with claim 22 wherein the means for retaining comprises a threaded insert having a configuration for maintaining the position of the alignment sleeve between the insert and a shoulder within the connector.

24. The method in accordance with claim 22 wherein the means for retaining comprises a retaining sleeve substantially surrounding the alignment sleeve.

25. The method in accordance with claim 24 further comprising:

mating the first connector housing with the second connector housing to slidably engage the termini of respective ones of the first and second connector housings within the alignment sleeve to align the termini of the first and second connectors for transmitting light therebetween.

* * * * *